United States Patent [19]

Jarrin et al.

[11] Patent Number: 4,756,843
[45] Date of Patent: Jul. 12, 1988

[54] COPOLYMER COMPOSITIONS USABLE AS ADDITIVES FOR LUBRICATING OILS

[75] Inventors: Jacques Jarrin, Boulogne; Magali Robine; Guy Parc, both of Rueil Malmaison; François Dawans, Bougival, all of France

[73] Assignee: Institut Francais Du Petrol, Rueil-Malmaison, France

[21] Appl. No.: 927,981

[22] Filed: Nov. 7, 1986

[30] Foreign Application Priority Data

Nov. 7, 1985 [FR] France .................. 85 16636

[51] Int. Cl.$^4$ ............... C10M 101/04; C08F 220/12
[52] U.S. Cl. ................. 252/56 R; 526/329.2
[58] Field of Search .............. 526/329.2; 252/56 S, 252/56 R

[56] References Cited

U.S. PATENT DOCUMENTS

| | | | |
|---|---|---|---|
| 3,642,633 | 2/1972 | Eckert et al. | 526/329.2 |
| 3,879,357 | 4/1975 | Wingler et al. | 526/329.2 |
| 3,976,716 | 8/1976 | Lakona et al. | 526/329.2 |
| 4,056,559 | 11/1977 | Lewis et al. | 526/329.2 |
| 4,136,047 | 1/1979 | Rogan et al. | 252/56 R |
| 4,225,651 | 9/1980 | Hutton et al. | 526/329.2 |
| 4,229,549 | 10/1980 | Usami et al. | 525/74 |
| 4,290,925 | 9/1981 | Pennewiss et al. | 252/56 S |
| 4,369,296 | 1/1983 | Podszun et al. | 526/329.2 |
| 4,370,460 | 1/1983 | Neubert et al. | 526/329.2 |
| 4,496,691 | 1/1985 | Proux et al. | 525/73 |

FOREIGN PATENT DOCUMENTS

56-112918  9/1981  Japan .................. 526/329.2

*Primary Examiner*—Joseph L. Schofer
*Assistant Examiner*—N. Sarofin
*Attorney, Agent, or Firm*—Millen & White

[57] ABSTRACT

Compositions of copolymers are disclosed containing 10 to 35% by weight of units derived from at least one vinylaromatic monomer, 5 to 15% by weight of units derived from at least one linear or branched alkyl methacrylate with 1 to 4 carbon atoms, 20 to 50% by weight of units derived from at least one linear alkyl methacrylate with 8 to 14 carbon atoms and 15 to 50% by weight of units derived from at least one linear alkyl methacrylate with 16 to 22 carbon atoms. The copolymer compositions have a weight average molecular weight of 100,000 to 400,000 and a polydispersity index in general of less than 5.

They are prepared by any free-radical copolymerization method using for example azo or peroxide initiators.

These compositions have the advantage of providing a better compromise between the characteristics required of a viscosity additive for lubricating oils.

18 Claims, No Drawings

COPOLYMER COMPOSITIONS USABLE AS ADDITIVES FOR LUBRICATING OILS

This invention relates to copolymers prepared by free-radical polymerization of a mixture of styrene and alkyl methacrylates. It also concerns their utilization as viscosity additives for the formulation of lubricant oils.

BACKGROUND OF THE INVENTION

The technical sector considered is that of polymers or copolymers used to improve the rheological performance of engine lubricating oils within their operating temperature range.

It is known that a formulated oil must have as high viscosity as possible at high temperature and as low viscosity as possible at low temperature. This characteristic is measured by the selectivity of an additive, defined as the relationship between the relative variation of the kinematic viscosity of the lubricating oil provided by the additive at high temperature (for example, 100° C.) and the relative variation of the kinematic viscosity at lower temperature (for example, 30° C.).

The selectivity of an additive depends in general on its composition or structure and its thickening power and therefore its molecular weight. A high thickening power makes it possible to formulate an oil with a smaller quantity of additive but only in so far as its mechanical shearing strength remains compatible with the application contemplated. Furthermore, the formulated oil must retain a low pour point. Various types of additives are known which meet a lesser or greater number of the criteria stated above. The performance for alkyl polymethacrylates in regard to temperature is good (selectivity between −18 and 150° C. of about 2). They lower the pour point of the oil to about −33° C., but their thickening power is limited by their mechanical shearing strength. Quantities on the order of 4 to 6% of additives are required to adjust the viscosity of the oil without the formulation becoming too sensitive to shearing. This is reflected by a higher usage cost of these additives than that of other additives of the hydrogenated diene-styrene copolymer type or of the ethylene-propylene copolymer type, for example, which has a higher shearing strength but a definitely lower selectivity than polymethacrylates (0.7 to 0.9 measured between −18° and 150° C.). Furthermore, the performance in cold conditions of these additives is not satisfactory and requires the addition of some anti-freeze additive, which is not necessary with viscosity additives of the polymethacrylate type.

Copolymers are also known which aim at combining the characteristics in solution of various homopolymers. These copolymers are made by grafting polymethacrylate onto a backbone of an olefinic copolymer or diene-styrene copolymer and improve the stability of the mixtures of olefinic polymers with freezing-point lowering additives of the polymethacrylate type (see U.S. Pat. No. 4,290,925). In practice, these techniques are difficult to apply and require the separate preparation of polymers and a mixing or emulsifying operation.

In addition, free-radical grafting techniques are rarely quantitative and there is always the risk of their leading to partially cross-linked products which would no longer be soluble in the base oils.

Styrene/alkylmethacrylate block copolymers are also known, which are prepared by the ionic pathway (see U.S. Pat. No. 4,136,047); they have a greater shearing strength than polymethacrylates. However, anionic copolymerization requires precautions to be taken which make its industrial use difficult. In particular, the operations must be carried out in the absence of oxygen and humidity.

Styrene/alkyl methacrylate copolymers are further known which are prepared by the free-radical way and have high styrene contents (35 to 55% by weight). To retain sufficient solubility, these products have a $C_{16}$ to $C_{20}$ alkyl methacrylate content of at least 80% by weight of the total methacrylate content (see European application No. 0,056,342).

They have a greater shearing strength than polymethacrylates and are compatible with styrenic polymers. However, they have appreciably lower selectivity than conventional polymethacrylates.

Finally, German Pat. No. 1,122,197 may be pointed out, which discloses additives for lubricating oils consisting of copolymers formed of 55 to 90% by weight of $C_{10}$ to $C_{18}$ alkyl acrylates, 5 to 45% by weight of $C_1$ to $C_4$ alkyl acrylates or methacrylates and 2 to 20% by weight of styrene (or substituted styrene). Because of the presence of acrylates, these polymers have too high a sensitivity to oxidation and insufficient thermal stability.

SUMMARY OF THE INVENTION

This invention makes it possible to combine in a single copolymeric product thickening power, selectivity and freezing point characteristics substantially equal to those of conventional polymethacrylates, with an increased resistance to shearing stresses and a lower material cost.

The products of the invention can be defined in a general way as consisting basically of compositions of copolymers with 10 to 35% by weight of vinylaromatic units (styrenic or alkylstyrenic) and of 90 to 65% by weight of units derived from methacrylic monomers, of which 5 to 15% by weight are derived from at least one linear or branched $C_1$ to $C_4$ alkylmethacrylate, 20 to 55% by weight are derived from at least one linear $C_8$ to $C_{14}$ alkyl methacrylate, and 15 to 50% by weight are derived from at least one linear $C_{16}$ to $C_{22}$ alkyl methacrylate. These proportions by weight are expressed with respect to the total units of the copolymer.

In the copolymer compositions thus defined, the proportion of units derived from alkyl methacrylates with at least 16 carbon atoms remains less than 70% by weight of the total of methacrylic units.

The weight average molecular weight of the products of the invention can range for example from 100,000 to 400,000 (as determined by gel permeation chromatography, standardised with poly-methylmethacrylate). Their polydispersity index is in general less than 5, preferably 2.5 to 3.

The vinylaromatic and methylacrylic units must be distributed in the copolymer chains as regularly as possible.

In the copolymer compositions of the invention the vinylaromatic units are derived more particularly from styrene or vinyltoluene, styrene being preferred. They preferentially represent 15 to 25% by weight of the total of copolymer units, the total of alkyl methacrylates then representing 85 to 75% by weight.

The $C_1$ to $C_4$ alkyl methacrylate is more particularly methyl methacrylate and advantageously represents 5 to 10% by weight of the total of copolymer units.

The proportion of units derived from $C_{18}$–$C_{14}$ alkyl methacrylates can be from 25 to 50% by weight and that of the units derived from $C_{16}$–$C_{22}$ alkyl methacrylates can be 20 to 50% by weight.

The copolymer compositions of the invention can be prepared by free-radical copolymerization, from appropriate proportions of the monomers.

To introduce the alkyl methacrylate units whose alkyl chains contain respectively 8 to 14 and 16 to 22 carbon atoms, use can be made of each of the monomers alone, or mixtures of various monomoers, as for example a commercial cut of $C_8$ to $C_{18}$ alkyl methacrylates and a commercial cut of $C_{14}$ to $C_{22}$ alkyl methacrylates.

Copolymerization is initiated by a conventional free-radical initiator such as those commonly used in this type of polymerization (azo or peroxide compound).

The copolymerization temperature is generally between 90 and 130° C., the solvent can be for example a mineral oil (100 or 200 N) used in a proportion of 20 to 50% by weight with respect to the reaction medium taken as a whole.

The copolymer compositions according to the invention are used as viscosity additives for mineral or synthetic lubricating oils. They are generally added in proportions ranging from 2 to 10% by weight with respect to the lubricating oil.

These compositions have the advantage of providing a better compromise between the various effects required of a viscosity additive: solubility, thickening power, selectivity, shearing strength and pour point.

The following examples illustrate the invention, but must in no way be considered as limitative. Examples 1 to 5, 6, 10, 12 and 13 are given as comparisons.

EXAMPLES 1 to 10

The preparation of the products considered in these examples is described hereinafter by reference to example 8.

Into a reactor provided with a vacuum connection, a neutral gas circulation and mechanical stirring, was introduced a mixture of oil, monomers and initiator having the following proportions:

| Solvent = | 100 Neutral Oil | | 26.6% by weight |
|---|---|---|---|
| Mixture of monomers | Styrene | 20% by weight | 70% by weight |
| | Methyl methacrylate (MMA) | 8% by weight | |
| | Lauryl methacrylate | 50% by weight | |
| | Stearyl methacrylate | 22% by weight | |
| Initiator = | Benzoyl peroxide | | 0.4% by weight |

By lauryl methacrylate and stearyl methacrylate are meant cuts of alkyl methacrylates respectively with 8 to 18 and 14 to 22 carbon atoms. The composition of the cuts used in the examples are given below.

Lauryl methacrylate (abbreviated LAUMA)

13% (±2%) $C_8$ alkyl methacrylate
16% (±2%) $C_{10}$ alkyl methacrylate
29% (±2%) $C_{12}$ alkyl methacrylate
21% (±2%) $C_{14}$ alkyl methacrylate
14% (±2%) $C_{16}$ alkyl methacrylate
7% (±2%) $C_{18}$ alkyl methacrylate.

Stearyl methacrylate (abbreviated SMA)

2% (±2%) $C_{14}$ alkyl methacrylate
51% (±2%) $C_{16}$ alkyl methacrylate
30% (±2%) $C_{18}$ alkyl methacrylate
14% (±2%) $C_{20}$ alkyl methacrylate
3% (±2%) $C_{22}$ alkyl methacrylate.

The reactor and products were carefully degasified by alternatively bringing them (4 or 5 times) under reduced pressure and under slight neutral gas pressure. The reactor was heated to 100° C. and maintained at that temperature for 5 hours. After this, the temperature was raised to 130° C. for 2 hours in order to polymerize any residual monomers and achieve the decomposition of the initiator. The viscosity of the final mixture was adjusted by adding about 40% by weight with respect to the mixture, of 100N oil before running the additive solution from the reactor.

The products of the other examples were prepared according to the same operating procedures, with different proportions of starting reagents (as indicated in Table 1).

Table 1 also give certain characteristics of the products obtained as well as several of their properties as additives in the oil.

The molecular weights given in Table 1 were determined by gel permeation chromatography, standardized with methyl poly-methylmethacrylate (PMMA); the thickening power (TP) corresponds to the quantity of polymer to be introduced into the 200N oil to obtain a viscosity of 15 mm$^2$/s at 100° C.

The selectivity is determined from the equation:

$$S_{30}^{100} = \left[ \frac{\eta - \eta_o}{\eta_o} \right]_{100° C.} \times$$

$$\left[ \frac{\eta_o}{\eta - \eta_o} \right]_{30° C.} \text{ where } \begin{cases} = \text{ kinematic viscosity } \eta \text{ of oil + polymer} \\ = \text{ kinematic viscosity } \eta_o \text{ of oil} \end{cases}$$

The loss in viscosity on shearing ($\Delta\eta\%$) is determined by the ORBAHN test according to standard DIN 51382 after 30 cycles.

The pour point is determined according to AFNOR standard T 60 105, with a polymer concentration such that a kinematic viscosity of 15 mm$^2$/s at 100° C. is obtained in the 200N oil.

TABLE 1

| Example | Proportions of the monomers (% by weight) | | | | Molecular weight | | | Properties in oil | | | |
|---|---|---|---|---|---|---|---|---|---|---|---|
| | Styrene | MMA | LAUMA (C$_8$-C$_{18}$) | SMA (C$_{14}$-C$_{22}$) | $\overline{M}_n$ standardisation | $\overline{M}_p$ MPMA | $I_p$ | TP (%) | $S_{30}^{100}$ | $\Delta\eta$ (%) | Pour point (°C.) |
| 1* | 0 | 0 | 70 | 30 | — | — | — | 4.0 | 1.32 | −30 | −33 |
| 2* | 10 | 0 | 63 | 27 | 87750 | 372575 | 4.24 | 3.85 | 1.26 | −22 | −33 |
| 3* | 20 | 0 | 56 | 24 | 69170 | 216000 | 3.12 | 5.20 | 1.23 | −11 | −33 |
| 4* | 30 | 0 | 49 | 21 | 65100 | 180000 | 2.72 | 5.30 | 1.18 | −8 | −24 |
| 5* | 40 | 0 | 42 | 18 | 61600 | 162000 | 2.62 | 5.65 | 1.11 | −6 | −15 |
| 6* | 0 | 8 | 64 | 28 | — | — | — | 4.5 | 1.37 | −27 | −33 |
| 7 | 10 | 8 | 57 | 25 | 71000 | 287480 | 4.04 | 4.45 | 1.43 | −20 | −33 |
| 8 | 20 | 8 | 50 | 22 | 67600 | 207000 | 3.06 | 5.25 | 1.38 | −9 | −27 |
| 9 | 30 | 8 | 43 | 19 | 71500 | 189000 | 2.62 | 5.60 | 1.32 | −8 | −15 |
| 10* | 40 | 8 | 36 | 16 | 55400 | 141000 | 2.54 | insoluble at ambient temperature | | | |

*comparative examples
$\overline{M}_n$: Number average molecular weight
$\overline{M}_p$: Weight average molecular weight
$I_p$ (= $\overline{M}_p/\overline{M}_n$): Polydispersity index According to the results given in table 1, it is seen that the styrene content must not be as high as 40% by weight to retain a satisfactory solubility and cold performance of the formulated 200N oil. It seems that a styrene content of between 15 and 25% by weight is to be preferred to retain a pour point of below −27° C.

The selectivity of the additives described depends on the styrene content and the methyl methacrylate content. However, for a same styrene content, the introduction of about 8% by weight of MMA makes it possible to obtain selectivities of the order of magnitude of those found with conventional polymethacrylates prepared in the absence of styrene.

The sensitivity to mechanical shearing determined by the drop in viscosity after 30 cycles during the test in the ORBAHN injector according to DIN standard 51 382 decreases as the styrene content increases.

The best compromise between all these characteristics seems to be provided by a product such as that of example 8 appearing in Table 1.

EXAMPLES 11 AND 12 (EXAMPLE 12 is a COMPARATIVE EXAMPLE)

Starting with the copolymer composition of example 8, the proportions of stearyl methacrylate was increased in accordance with the values indicated in table 2 hereinafter.

The method of preparation was the same as that previously described for the copolymer of example 8.

The thickening power of each of the copolymers of examples 11 and 12 was determined and, at the copolymer concentration fixed thereby, the selectivity between 30 and 100° C., as well as the pour point of the oil containing the additive, were determined.

The results obtained are given in Table 2.

By considering these results and those obtained for the copolymer of example 8, it is seen that increasing the proportion of long chain alkyl methacrylates with respect to the proportion of medium length chain alkyl methacrylates results in a weakening of selectivity and a major reduction in the lowering of the pour point.

EXAMPLE 13 (COMPARATIVE)

A copolymer was prepared by the same operating procedure as in example 8, using the proportions of monomers indicated in Table 2. The proportion of styrene was increased up to 40% by weight and the proportion of long chain alkyl methacrylates was raised to 80% by weight with respect to the total of the alkyl methacrylates involved.

The thickening power of this copolymer was also determined, as well as, at the concentration obtained so, the selectivity and the pour point of the oil. The results are given in Table 2. It is seen that the copolymer is not suitable as an additive, essentially because of its unfavorable effect on the pour point.

TABLE 2

| Example | Proportions of the monomers (% by weight) | | | | Properties in oil | | |
|---|---|---|---|---|---|---|---|
| | Styrene | MMA | LAUMA (C$_8$-C$_{18}$) | SMA (C$_{14}$-C$_{22}$) | TP (%) | $S_{30}^{100}$ | Pour point (°C.) |
| 11 | 20 | 8 | 32 | 40 | 4.0 | 1.20 | −30 |
| 12* | 20 | 8 | 10 | 62 | 5.8 | 0.99 | −18 |
| 13* | 40 | 5 | 7 | 48 | 4.4 | 1.40 | −18 |

*Comparative examples

What is claimed:

1. A copolymer, usable as a viscosity additive for lubricating oils, characterized in that it consisting essentially of
   10 to 35% by weight of units derived from at least one vinylaromatic monomer;
   90 to 65% by weight of units derived from methacylic monomers of which:
   5 to 15% by weight are derived from at least one linear or branched C$_1$ to C$_4$ alkyl methacrylate;
   20 to 55% by weight are derived from at least one linear C$_8$ to C$_{14}$ alkyl methacrylate;
   15 to 50% by weight are derived from at least one linear C$_{16}$ to C$_{22}$ alkyl methacrylate;
   these proportions by weight being expressed with respect to the total of the units constituting the copolymer.

2. A copolymer composition according to claim 1, characterized in that it has a weight average molecular weight of 100,000 to 400,000.

3. A copolymer composition according to claim 1, characterized in that it has a polydispersity index of less than 5.

4. A copolymer composition according to claim 1, characterized in that said vinylaromatic monomer is styrene.

5. A copolymer composition according to claim 4, characterized in that the units derived from at least one $C_1$ to $C_4$ alkyl methacrylate represent 5 to 10% by weight;
the units derived from at least one $C_8$ to $C_{14}$ alkyl methacrylate represent 25 to 50% by weight; and
the units derived from at least one $C_{16}$ to $C_{22}$ alkyl methacrylate represent 20 to 50% by weight of the total units constituting the copolymer.

6. A copolymer composition according to claim 1, characterized in that said $C_1$ to $C_4$ alkyl methacrylate is methyl methacrylate.

7. A copolymer composition according to claim 1, characterized in that the $C_8$ to $C_{14}$ alkyl methacrylate and the $C_{16}$ to $C_{22}$ alkyl methacrylate are derived from a commercial cut containing a preponderant proportion of lauryl methacrylate and a commercial cut containing a preponderant proportion of stearyl methacrylate.

8. A lubricating composition characterized in that it comprises a major proportion of lubricating oil and a minor proportion, sufficient to improve the viscosity properties, of at least one copolymer composition consisting essentially of
10 to 35% by weight of units derived from at least one vinylaromatic monomer;
90 to 65% by weight of units derived from methacrylic monomers of which:
5 to 15% by weight are derived from at least one linear or branched $C_1$ to $C_4$ alkyl methacrylate;
monomers of which:
20 to 55% by weight are derived from at least one linear $C_8$ to $C_{14}$ alkyl methacrylate;
15 to 50% by weight are derived from at least one linear $C_{16}$ to $C_{22}$ alkyl methacrylate;
these proportions by weight being expressed with respect to the total of the units constituting the copolymer.

9. A lubricating composition according to claim 8, characterized in that the proportion of the copolymer composition is 2 to 10% by weight with respect to the lubricating oil.

10. A copolymer composition according to claim 1, wherein the polydispersity index is 2.5 to 3.

11. A copolymer composition according to claim 1, comprising:
10% by weight styrene
8% by weight methyl methacrylate
57% by weight lauryl methacrylate
25% by weight stearyl methacrylate.

12. A copolymer composition according to claim 1, comprising:
20% by weight styrene
8% by weight methyl methacrylate
50% by weight lauryl methacrylate
22% by weight stearyl methacrylate.

13. A copolymer composition according to claim 1, comprising:
30% by weight styrene
8% by weight methyl methacrylate
43% by weight lauryl methacrylate
19% by weight stearyl methacrylate.

14. A copolymer composition according to claim 1, comprising:
20% by weight styrene
8% weight methyl methacrylate
32% by weight lauryl methacrylate
40% by weight stearyl methacrylate.

15. A copolymer composition according to claim 1, comprising:
10–30% by weight styrene
8% by weight methyl methacrylate
32–57% by weight lauryl methacrylate
19–40% by weight stearyl methacrylate.

16. A copolymer according to claim 4, wherein the units derived from styrene represents 15–25% by weight of the total units constituting the copolymer.

17. A copolymer according to claim 1, wherein the units derived from the vinyl aromatic monomer represent 15 to 25% by weight of the total units constituting the copolymer.

18. A copolymer according to claim 4, characterized in that said $C_1$ to $C_4$ alkyl methacrylate is methyl methacrylate.

* * * * *

UNITED STATES PATENT AND TRADEMARK OFFICE
CERTIFICATE OF CORRECTION

PATENT NO. : 4,756,843

DATED : July 12, 1988

INVENTOR(S) : Jarrin et al

It is certified that error appears in the above-identified patent and that said Letters Patent is hereby corrected as shown below:

Title Page, 73 , Assignee:

should read: --Institut Francais Du Petrole--
Rueil-Malmaison, France

Signed and Sealed this

Sixth Day of December, 1988

Attest:

DONALD J. QUIGG

Attesting Officer

Commissioner of Patents and Trademarks